US010826599B1

(12) United States Patent
Roy et al.

(10) Patent No.: US 10,826,599 B1
(45) Date of Patent: Nov. 3, 2020

(54) SATELLITE BEAM HOPPING

(71) Applicant: Hughes Network Systems, LLC, Germantown, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/530,480

(22) Filed: Aug. 2, 2019

(51) Int. Cl.
*H04B 7/185* (2006.01)
*H04B 7/204* (2006.01)
*H04B 7/212* (2006.01)
*H04L 12/26* (2006.01)

(52) U.S. Cl.
CPC ....... *H04B 7/2125* (2013.01); *H04B 7/18515* (2013.01); *H04B 7/18526* (2013.01); *H04B 7/2041* (2013.01); *H04L 43/0852* (2013.01); *H04L 43/0894* (2013.01)

(58) Field of Classification Search
CPC .............. H04B 7/2125; H04B 7/18515; H04B 7/2041; H04B 7/18526; H04L 43/0894; H04L 43/085
See application file for complete search history.

(56) References Cited

U.S. PATENT DOCUMENTS

2011/0268017 A1* 11/2011 Miller ................. H04B 7/2041
370/321
2014/0334318 A1* 11/2014 Pica ..................... H04W 36/14
370/252

FOREIGN PATENT DOCUMENTS

WO    WO2019233684 A1 * 12/2019    ........... H04B 4/2041

* cited by examiner

*Primary Examiner* — Dong-Chang Shiue
(74) *Attorney, Agent, or Firm* — Bejin Bieneman PLC

(57) ABSTRACT

A system comprises a modulator, a time synchronization system, a satellite gateway computer, and a traffic gateway. The modulator is configured to transmit a first and a second carrier on a feeder uplink frequency to a beam-hopping-capable satellite according to a time schedule. The timing synchronization system is configured to synchronize a satellite gateway computer, the modulator, and the beam hopping capable satellite, based on the transmit time schedule and a propagation delay. The satellite gateway computer is programmed to determine transmit time schedule for the modulator, format and relay packets destined to the first and second downlink beam to the modulator to be transmitted on the first and second carrier during the first and second dwell time slot.

10 Claims, 4 Drawing Sheets

SATELLITE BEAM HOPPING

BACKGROUND

Satellite communication is utilized as a wireless communication technology, e.g., for Internet access, enterprise intranet connectivity, TV (television) broadcasting services, etc. To improve resource utilization, satellites may perform beam hopping to service multiple spot beams.

DETAILED DESCRIPTION

Introduction

Figure 1:
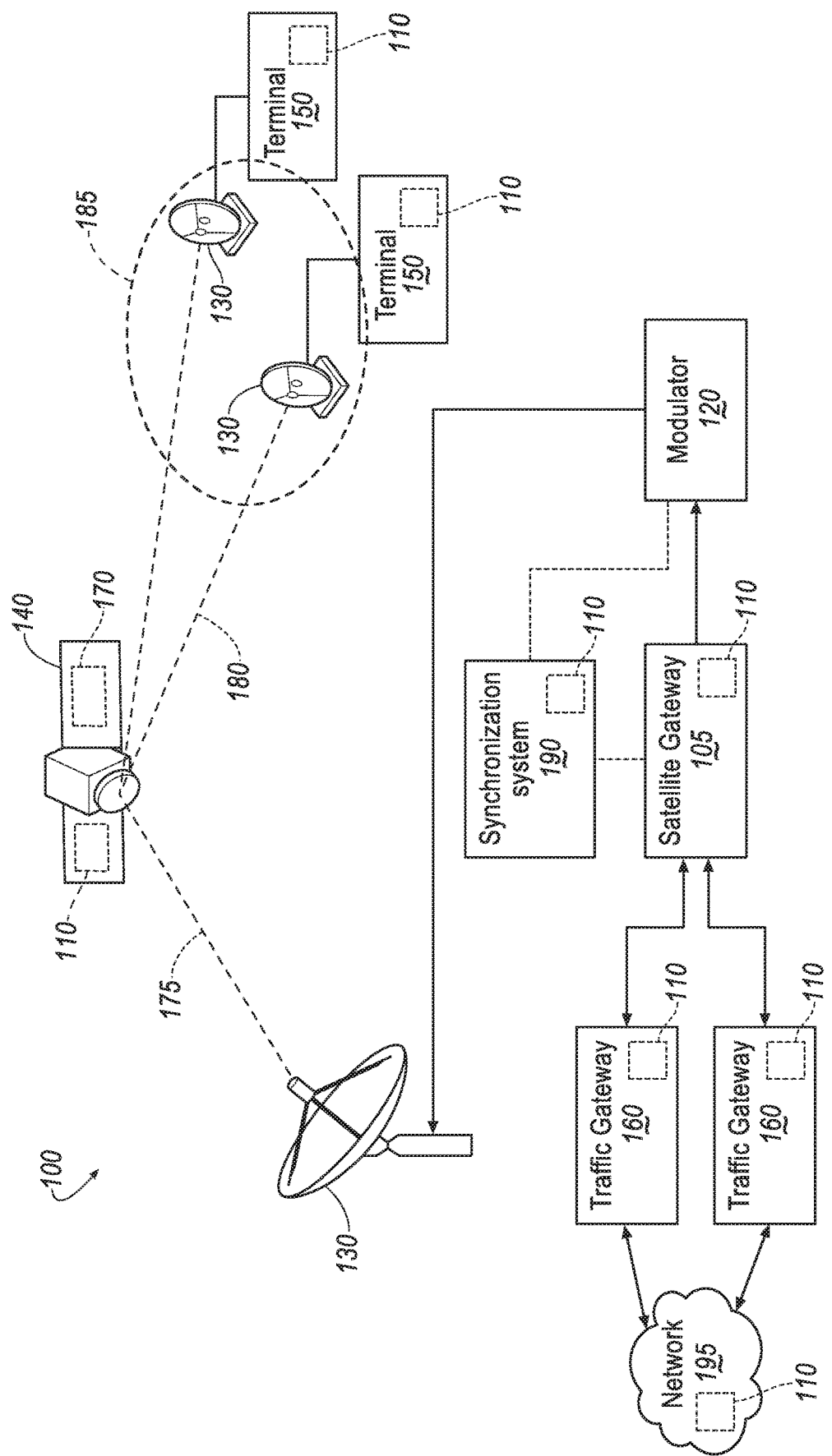
FIG. 1 illustrates an example satellite network for beam hopping.

A system comprising a modulator, controlled by a satellite gateway computer, configured to transmit a first and a second carrier on a feeder uplink frequency to a beam-hopping-capable satellite according to a repeating, non-overlapping beam-hopping time schedule, the first carrier transmitted during a first dwell time slot, and the second carrier transmitted during a second dwell time slot; the beam-hopping-capable satellite relaying the received uplink first carrier corresponding to the first dwell time slot to at least a first downlink user beam and the received uplink second carrier corresponding to the second dwell time slot to at least a second downlink user beam. The system further comprises a timing synchronization system configured to synchronize a satellite gateway computer, the modulator, and the beam hopping capable satellite, based on the beam-hopping time schedule and a propagation delay. The traffic gateway is configured to receive data packets from a terrestrial network, and based on the user beam associated with each packet destination, relay packets to the satellite gateway computer. The satellite gateway computer is programmed to determine transmit time schedule for the modulator based on the beam-hopping time schedule and input received from the timing synchronization system, to format and relay packets destined to the first downlink beam to the modulator to be transmitted on the first carrier during the first dwell time slot, and to format and relay packets destined to the second downlink beam to the modulator to be transmitted on the second carrier during the second dwell time slot.

The time synchronization system may be further programmed to upon receiving a beam-hopping time schedule change request from the satellite gateway, coordinate among at least the satellite gateway, the satellite, and the modulator to adjust the beam-hopping time schedule; and to transmit the adjusted beam-hopping time schedule, via a payload configuration channel, to the beam-hopping-capable satellite.

The timing synchronization system may be further programmed to determine the propagation delay and transmit the propagation delay to the satellite.

The satellite gateway may be further programmed to maintain a first transmit queue for the first carrier independent from a second transmit queue for the second carrier.

The satellite gateway may be further programmed to estimate a first capacity for the first carrier based on a first bandwidth and a first data throughput, to estimate a second capacity for the second carrier based on a second bandwidth and a second data throughput, to send a first flow control instruction to a first source of the first carrier, and to send a second flow control instruction to a second source of the second carrier.

A computer in the beam-hopping-capable satellite comprises a processor and a memory. The memory stores instructions executable by the processor to actuate a satellite transponder to switch from the first downlink beam to the second downlink beam based on the time schedule and the propagation delay.

The traffic gateway may be configured to relay packets, based on each packet destination, via a backhaul network, to one of (i) the satellite gateway and (ii) a second satellite gateway connected to a second modulator.

The satellite gateway may be further programmed to send packets to the modulator based on a flow control instruction received from the modulator.

Exemplary System Elements

As disclosed herein, a satellite gateway is disclosed that transmits, via a feeder uplink, carrier data and time schedule data to a beam-hopping-capable satellite for multiple downlink beams of the satellite, and the satellite transmits carrier data associated with each down link based on the time schedule by hopping between beams based on the received time schedule.

In order to perform beam hopping, a gateway computer can be connected to a modulator, a timing synchronization system, and one or more traffic gateways. The modulator can be configured to transmit a first and a second carrier on a feeder uplink frequency to a beam-hopping-capable satellite according to a repeating, non-overlapping transmit beam-hopping time schedule, the first carrier transmitted during a first dwell time slot, and the second carrier transmitted during a second dwell time slot. The beam-hopping-capable satellite can be configured to relay the received uplink first carrier corresponding to the first dwell time slot to at least a first downlink beam and the received uplink second carrier corresponding to the second dwell time slot to at least a second downlink beam.

The timing synchronization system can be configured to synchronize the satellite gateway computer, the modulator, and the beam hopping capable satellite, based on the beam-hopping time schedule and a propagation delay, and upon receiving a beam hopping time plan change request from the satellite gateway, coordinate among at least the satellite gateway, the satellite, and the modulator to adjust the beam-hopping time schedule. The traffic gateway can be configured to receive data packets from a terrestrial network, and based on the user beam associated with each packet destination, relay packets to the satellite gateway computer.

The satellite gateway computer can be programmed to determine transmit time schedule for the modulator based on the beam-hopping time schedule and input received from the timing synchronization system, to format and relay packets destined to the first downlink beam to the modulator to be transmitted on the first carrier during the first dwell time slot, and to format and relay packets destined to the second downlink beam to the modulator to be transmitted on the second carrier during the second dwell time slot.

As illustrated in FIG. 1, a satellite network 100 may include any number of gateway(s) 105, modulator(s) 120, dish(es) 130, satellites 140, a synchronization system 190, traffic gateways 160, and a terrestrial network 195. A computer 110 may be included in a gateway 160, satellite 140, synchronization system 190, traffic gateway 160, and/or the terrestrial network 195. A computer, as that term is used herein, refers to a machine including a processor and memory. A computer memory can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. A processor in computer 110 may be programmed to execute instructions stored in a computer memory to carry out the actions of gateway 160, satellite 140, synchronization system 190, traffic gateway 160, the terrestrial network 195, etc., as discussed herein.

Satellite 140 may include a computer 110 and a transponder 170. A transponder 170 may operate on a bent pipe (i.e., u-bend) principle, sending back to Earth what goes into the conduit with only amplification and a shift from an uplink frequency to a downlink frequency.

In the present context, a satellite link 175, 180 may include an uplink 175, including communication from the gateway 105 or a terminal 150 to a satellite 140 and a downlink 180, which includes communication from the satellite 140 to the gateway 105 or a terminal 150. A direction of data transmission from the gateway 105 to the terminals 150 is referred to as "out-route" and a direction of data from terminals 150 to the gateway 105 is referred to as "in-route." An out-route uplink 175 to the satellite 140 may be herein referred to as a feeder uplink 175 because such link feeds or provides data to the satellite 140 to be forwarded to the terminal(s) 150. An out-route downlink 180 to a terminal 150 may be herein referred to as a user beam 180 or a user downlink beam 180.

Each satellite 140 beam has a coverage area 185. In the present context, a coverage area 185 of a satellite 140 is a geographical area on the surface of Earth, in which a terminal 150 may communicate with the satellite 140. Each satellite 140 may have any number (one or more) of beams that cover different coverage areas 185. Each terminal 120 in a coverage area 185 of a beam may receive data from the satellite 140 via a downlink 180.

A satellite 140 may service multiple terminals 150, e.g., in multiple geometrical regions within the coverage area 185, by switching (or hopping) between a first beam to a second beam, which is typically referred to as beam-hopping. Thus, a bandwidth of a satellite 140 may be split between multiple beams, where a first beam may transmit a first carrier whereas a second beam may transmit a second carrier. A satellite 140 that is able to perform beam-hopping is herein referred to as a beam-hopping-capable satellite 140.

Carrier data (or a data stream) in the present context is a set of data communicated in the system 100 with a defined destination, e.g., a spot beam of the satellite 140 with a coverage area 185 including one or more terminals 150. As discussed below, a carrier frequency may change as the carrier data (or a carrier data packet) is being relayed between various components of the system 100, e.g., at the satellite 140 from an uplink frequency to a downlink frequency. In the present context, "relaying" carrier data or data packets means forwarding data received from a source, e.g., the gateway 105, to a destination, e.g., the terminal 150.

A bandwidth of a communication component, e.g., satellite 150, gateway 105, etc., is an amount of data throughput that the respective communication component can process, e.g., relay, in a unit of time specified in, e.g., Gigabit/second (Gb/s), Megabit/second (Mb/s), etc.

The terminals 150, e.g., very small aperture terminals (VSAT), are computer-based communication devices implemented via circuits, chips, antennas, or other electronic components that can communicate with satellites 140 that are within communication range of the terminal 150. In some instances, the terminals 150 are stationary relative to a location on Earth. In other instances, the terminals 150 are mobile, meaning that the terminals 150 move relative to a location on the Earth. In some instances, the terminal 150 may provide an interface between a satellite 140 and other ground-based communication devices. For instance, the terminal 150 may receive communications from a satellite 140 and transmit such communications via terrestrial-based communication channels.

A terminal 150 may include a modulator and a demodulator to facilitate communications with satellites 140. Moreover, each terminal 150 may have an encoder to encode outgoing data and/or a decoder to decode received data. A terminal 150 may include or be communicatively connected to one or more dish(s) 130 including one or more antennas, which allow a terminal 150 to communicate with one or more satellites 140 at a time. A dish 130 antenna may include a low-noise block downconverter (LNB) mounted on the dish 130, which may collect radio waves from the dish 130 and convert the collected radio waves to a signal which is sent through wired connection, e.g., a cable, to the terminal 150. Antenna may be a combination of low-noise amplifier, frequency mixer, local oscillator, and intermediate frequency (IF) amplifier. The antenna serves as a radio frequency (RF) front end of a terminal 150, receiving a microwave signal from a satellite 140 collected by the dish 130, amplifying the received signal, and converting the block of frequencies to a lower block of intermediate frequencies (IF). This conversion of RF to a lower block of IF, allows the signal to be carried, e.g., via a wired connection, to a terminal 150. An antenna typically includes a sender antenna configured to send radio waves to a satellite 140, and/or a receiver antenna configured to receive radio waves from a satellite 140.

A gateway 105 is a device including a computer 110 that is programmed to receive data packets from a traffic gateway 160 computer 110 and to relay the received data packets to the modulator 120 to be transmitted on a carrier via the feeder uplink 175 to the satellite 140. The gateway 105 computer 110 may be connected to the modulator, e.g., via a Peripheral Component Interconnect (PCI) bus, an IP (Internet Protocol)-network, etc. The gateway 105 may be connected to the traffic gateway 160 via an IP communication interface and/or any other suitable wired or wireless communication interface. The gateway 105 may be coupled to the timing synchronization system 190, as discussed further below.

A modulator 120 is a device that performs modulation. Modulation is a process of varying one or more properties of a carrier signal that typically contains information to be transmitted. The modulator 120 may include electronic elements such as chips, circuits, computer 110, etc. The modulator 120 may be configured or programmed to modulate carrier data received from the gateway 105 and to transmit the modulated data via the dish 130 and the feeder uplink 175 to the satellite 140.

A traffic gateway 160 typically receives data packets from a terrestrial network 195 and relays the received data packets to a gateway 105 computer 110 based on a user beam terminal 150 addressed by each packet destination. The traffic gateway 105 computer 110 may store data including coverage areas 185 of a satellite 140 and an identifier of a gateway 105 with an uplink 175 to each given coverage area 185. Thus, the traffic gateway 160 may identify a suitable gateway 105 for the data packet based on the stored data and the destination of the data packet. Additionally or alternatively, the traffic gateway 160 may include one or more computers 110 programmed to perform one or more of receiving data packets, perform QoS (Quality of Service) control operations, ensure a bandwidth allocated for a client is provided based on an established service plan, e.g., providing 100 Megabit/second (Mb/s) of bandwidth to a terminal 150. As discussed below, a traffic gateway 160 may adjust a data throughput sent to a gateway 105 based on instructions, e.g., flow control instructions, received from the gateway 105. The system 100 may include a plurality of traffic gateways 160 which may be geographically centralized or distributed in different geographical locations.

The network 195 includes computers 110 and/or communication networks (wired and/or wireless) that connect the traffic gateway(s) 160 to remote computers such as a server included in a public network, e.g., Internet. The network 195 may include a terrestrial communication system, e.g., LTE (Long-Term Evolution), 5G, etc., including a mobile network backbone and a plurality of base stations. The base stations may be connected to the backbone via a wired and/or wireless network.

Figure 2A:
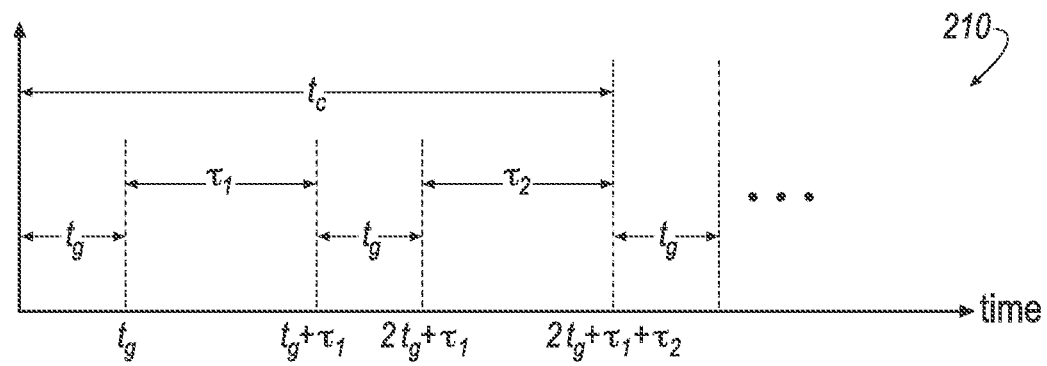
FIG. 2A shows a graph of repeating non-overlapping time schedule

With reference to FIG. 2A, a graph 210 shows a repeating, non-overlapping transmit time schedule for transmitting carrier data to the satellite 140. With reference to FIG. 1 and the graph 210 (FIG. 2A), the modulator 120 can be configured to transmit a first and a second carrier on a feeder uplink 175 having a specified uplink frequency to a beam-hopping-capable satellite 140 according to a repeating, non-overlapping transmit time schedule, the first carrier transmitted during a first dwell time slot $\tau_1$, and the second carrier transmitted during a second dwell time slot $\tau_2$.

A dwell time slot $\tau_1$, $\tau_2$ (or time span) is a time allocated in the time schedule for transmitting data associated with a specified carrier. Dwell time slots $\tau_1$, $\tau_2$ may have different or same durations. A time schedule may include any number of carriers, i.e., any n number of dwell time slots $\tau_1$, $\tau_2$, ..., $\tau_n$.

The repeating non-overlapping beam-hopping time schedule specifies timing of transmitting each carrier data on the feeder uplink 175 to the satellite 140. A time schedule has a duration or cycle time $t_c$. The time schedule may be specified by the gateway 105 computer 110 as discussed below. In the present context, "repeating" a time schedule means the time schedule with a cycle time $t_c$ is iteratively started over to continue modulating data for transmitting. "Non-overlapping" means at any time of the time schedule data associated with only one of the carriers is being transmitted. In other words, there is no overlap between, e.g., the first and second dwell time slots $\tau_1$, $\tau_2$.

As discussed above, the modulator 120 is configured to transmit the first and second carrier data on a feeder uplink 175 (i.e., one carrier frequency). Thus, the satellite 140 may need to distinguish first and second carrier based on the time schedule and the associated dwell time slots $\tau_1$, $\tau_2$. In one example, the time schedule may include guard times $t_g$ prior to start of each dwell time slot $\tau_1$, $\tau_2$. Thus, guard times $t_g$ may prevent a loss of data at a time of beam hopping. For example, Equation (1) defines a time schedule cycle time $t_c$ based on the guard times $t_g$ and the dwell time slot durations $\tau_1$, $\tau_2$, ..., $\tau_n$. As discussed above, in this example, a guard time $t_g$ may be placed before each dwell time slot $\tau_1$, $\tau_2$, ..., $\tau_n$, therefore the cycle time $t_c$ includes n guard times $t_g$. A guard time $t_g$ is a time within which no carrier data is transmitted. A duration of a guard time $t_g$ may be defined based on time precision characteristics of the system. In one example, the guard time $t_g$ is 10 times larger than a time inaccuracy of the system.

$$t_c = n \cdot t_g + \tau_1 + \tau_2 + \ldots + \tau_n \quad (1)$$

Figure 2B:
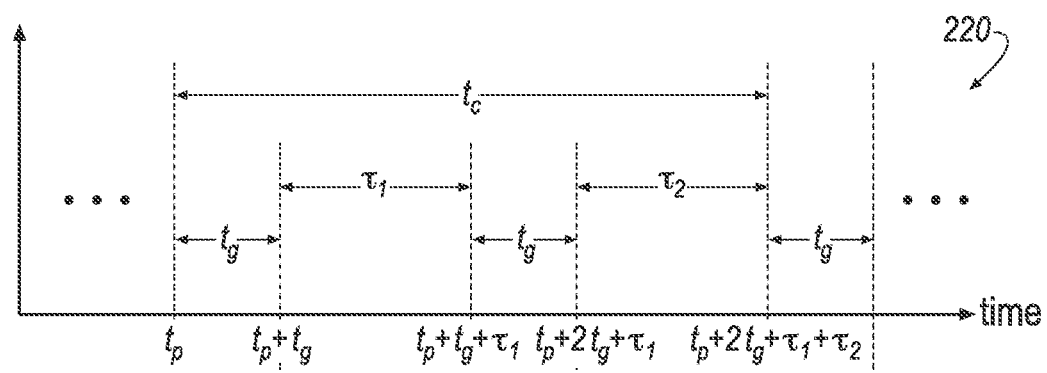
FIG. 2B shows the time schedule at the satellite with a propagation delay

The first and second carrier data modulated by the modulator 120 based on the time schedule may be then transmitted via the dish 130 and the feeder uplink 175 to the satellite 140. With reference to FIG. 2B, a graph 220 shows the time schedule of first and second carrier data received at the satellite 140 with a propagation delay $t_p$. The propagation delay $t_p$ is a time to transmit data from the modulator 120 to the satellite 140. The propagation delay $t_p$ may include delays caused by electronic components such as chips, etc., and/or the transmission time of the satellite feeder uplink 175.

The modulator 120 receives first and second carrier data from the gateway 105 and may temporarily store the data of each carrier independently until the data is output via the feeder uplink 175. For example, the modulator 120 may maintain independent memories or independent sections of the gateway 105 computer 110 memory to perform a First-In-First-Out (FIFO) operation. The modulator 120 may receive first carrier data from the gateway 105 and store it in a first memory and receive second carrier data from the gateway 105 and store it in a second memory. Upon outputting the data, the data may be deleted or overwritten in the queue. The modulator 120 may be configured to send a flow control instruction to the gateway 105 including a status of the first and second queues, e.g., available memory space, an instruction to increase or reduce data throughput, etc. Thus, an overflow of memory sections in the modulator 120 may be prevented.

The beam-hopping-capable satellite 140 can be configured to relay the received uplink first carrier corresponding to the first dwell time slot $\tau_1$ to at least a first downlink 180 beam and the received uplink second carrier corresponding to the second dwell time slot $\tau_2$ to at least a second downlink 180 beam. The satellite 140 computer 110 may be programmed to actuate a satellite 140 transponder 170 to switch from the first downlink 180 beam to the second downlink 180 beam based on the time schedule and the propagation delay $t_p$. Thus, the satellite 140 may transmit the first carrier data via a first downlink with the first satellite beam modulated by a first frequency and the second carrier data via the second satellite beam modulated by a second frequency.

Figure 2C:
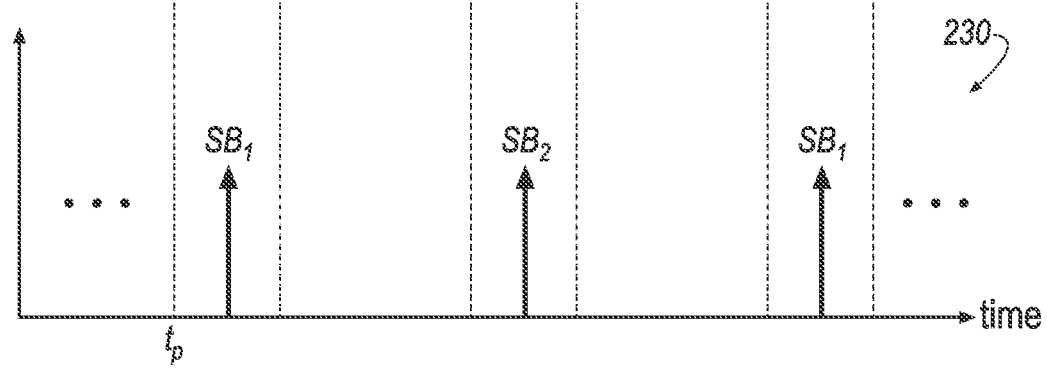
FIG. 2C shows a graph of beam hopping actuations.

As shown in graphs 210, 220, due to the propagation delay $t_p$, a time window between times $t_g$ and $t_g+\tau_1$ in which the modulator 120 transmits the first carrier differs from the time window of times $t_p+t_g$ and $t_p+t_g+\tau_1$ in which the satellite 140 receives the first carrier data. With reference to FIG. 2C, a graph 230 shows beam switching times $SB_1$, $SB_2$ of satellite 140 transponder 170 for switching between the downlink 180 beams. For example, to ensure that the satellite 140 switches between the first and second downlink beams for transmitting the first and second carrier based on the time schedule, the satellite 140 computer 110 may be programmed to switch between the first and second beams within the first time windows of times $t_p+t_g$ and $t_p+t_g+\tau_1$ or second times windows of times $t_p+2t_g+\tau_1$ and $t_p+2t_g+\tau_1+\tau_2$. In one example, the satellite 140 computer 110 may be programmed to switch in a middle of guard times (i.e., $$\frac{1}{2}t_g$$

since start of the respective guard time $t_g$) such as times $$t_p + \frac{1}{2}t_g, t_p + \frac{3}{2}t_g + \tau_1.$$

As discussed above, the time schedule may include any n number of dwell time slots $\tau_1, \tau_2, \ldots, \tau_n$. Thus, the satellite 140 computer 110 may be programmed to actuate the satellite 140 transponder 170 to switch at switching times $SB_1, SB_2, \ldots SB_n$. As discussed below, the synchronization system 190 may determine the propagation delay A terminal 150 which is a destination of a data packet transmitted via the first or second carrier may be configured to receive data via a respective satellite 140 beam. For example, a first terminal 150 and a second terminal may be configured to establish a first and a second downlink 180. As discussed above, the satellite 140 transmits the first carrier via the first beam and the second carrier via the second beam. Thus, the first terminal 150 receives the first carrier via the first downlink beam and the second terminal 150 receives the second carrier via the second downlink beam. In one example, a first coverage area 185 of the first beam may overlap with a second coverage area 185 of the second beam. Thus, in one example, the first and second terminals 150 may be in an area covered by the first and second beams, however, the first terminal 150 may receive the first carrier whereas the second terminal 150 receives the second carrier data.

The synchronization system 190 or another remote computer can be programmed to determine the repeating, non-overlapping beam-hopping transmit time schedule based on the first and second carrier, the satellite 140 bandwidth, and the gateway 105 bandwidth. For example, the synchronization system 190 may be programmed to receive a beam-hopping time schedule change request for the satellite gateway 105 specifying, e.g., a request to include a third dwell time $\tau_3$ in the time schedule, and to adjust the time schedule based on the received change request, the capacity of the satellite 140, etc. The synchronization system 190 may be programmed to transmit the adjusted time schedule to the satellite(s) 140 via a payload configuration channel. A payload configuration channel, in the present context, is a communication channel such a a feeder uplink 175 or a telemetry, tracking and control (TT&C) link via a separate facility, e.g., a remote computer. The gateway 105 computer 110 can be programmed to determine a transmit time schedule for the modulator 120 based on the beam-hopping time schedule and input received from the timing synchronization system 190, e.g., the propagation delay time, then to format and relay packets destined for the first downlink beam 180 to the modulator 120 to be transmitted on the first carrier during the first dwell time slot $\tau_1$, and to format and relay packets destined for the second downlink beam 180 to the modulator 120 to be transmitted during a second dwell time slot $\tau_2$. Thus, the satellite gateway 105 hides the beam hopping operation from the traffic gateway 160 with respect to a data packet processing and traffic scheduling function so that two carriers are viewed as two separate out-routes. In other words, the traffic gateway 160 visibility into or of the beam hopping.

In one example, the gateway 105 computer 110 may determine a dwell time slot $\tau_1, \tau_2$ based on an available bandwidth of the gateway 105 and the satellite 140. In an example, assuming a total bandwidth $BW_T$ of 1 Gb/s, a cycle time $t_c$ of 1000 milliseconds (ms), a guard time of 10 ms, and a dwell time slot $\tau_1$ of 400 ms, a first bandwidth of the first carrier is 400 Mb/s. Thus, within 1 second, the first carrier can transmit a maximum of 400 Mb of data within the allocated first dwell time slot $\tau_1$. Thus, the first carrier has a first bandwidth $BW_1$ of 400 Mb/s. The gateway 105 computer 110 may determine a second dwell time slot $\tau_2$ of 580 ms, which, in this example, means the second carrier may have a second bandwidth $BW_2$ of 580 Mb/s. Note that a total effective bandwidth $BW_{Te}$ of the feeder uplink 175 is then 980 Mb/s due to the two guard times $t_g$ of 20 ms, whereas a total bandwidth $BW_T$ is 1 Gb/s. Effective bandwidth $BW_{Te}$ is a bandwidth utilized to transmit user data, whereas total bandwidth $BW_T$ is the bandwidth used for user data, lost bandwidth due to guard times $t_g$, and transmission of any overhead data such as protocol control data, etc. Additionally or alternatively, dwell time slots $\tau_1, \tau_2$ may be specified in Msps (symbols per second). In case of a system 100 using adaptive coding or modulation, such dwell times $\tau_1, \tau_2$ may vary in terms of effective Mbps capacity.

The gateway 105 may determine a time schedule with any number of carriers. In one example, the gateway 105 is programmed to adjust or update the time schedule to include a third carrier to the time schedule based on the bandwidths $BW_1$, $BW_2$, total bandwidth $BW_T$ of the gateway 105, and a third requested bandwidth $BW_3$. For example, the computer 110 of the gateway 105 may determine that the third carrier can be added to the time schedule upon determining that an unused time in the time schedule is sufficient to transmit the third bandwidth $BW_3$. The unused time is the time in the time schedule that is not allocated to any carrier. Additionally or alternatively, the computer 110 may be programmed to adjust a time schedule cycle time to $t_c$ add a third carrier, e.g., by extending the cycle time $t_c$.

In the present context, an available capacity of a carrier is an "unutilized" bandwidth $BW_1$, $BW_2$ of the carrier. In the present context, an "unutilized bandwidth" is an allocated bandwidth based on the dwell time slot for a carrier which is not used. For example, if within the dwell time slot $\tau_1$ of example above with the first bandwidth of 400 Mb/s, a data throughput of 300 Mb/s is being transmitted, then a first capacity of the first carrier is 100 Mb/s. Thus, a traffic gateway 160 of the respective carrier may increase the data throughput of the first carrier by 100 Mb/s to entirely utilize the first carrier bandwidth, i.e., reducing the first capacity to 0 (zero).

In order to control a flow of data from the traffic gateway 160, the gateway 105 computer 110 may send a flow control instruction to the traffic gateway 160. In one example, with reference to FIG. 1, the gateway 105 may receive the first carrier data from a first traffic gateway 160 and the second carrier data from a second traffic gateway 160. The satellite gateway 105 computer 110 may be programmed to estimate a first capacity $C_1$ for the first carrier based on a first bandwidth $BW_1$, e.g., 400 Mb/s, and a first data throughput $D_1$, e.g., 400 Mb/s, to estimate a second capacity $C_2$ for the second carrier based on a second bandwidth $BW_2$, e.g., 400 Mb/s, and a second data throughput $D_2$, e.g., 300 Mb/s, to send a first flow control instruction to a first traffic gateway 160, and to send a second flow control instruction to a second traffic gateway 160. For example, the gateway 105 computer 110 may be programmed based on Equation (2) to determine the first and second capacities. Parameters $BW_i$, $C_i$, $D_i$ represent the bandwidth, data throughput, and capacity of an i-th carrier. Note that the first and second traffic gateway 160 may be a same traffic gateway 160, i.e., a traffic gateway 160 is not necessarily dedicated to only one satellite gateway 105 and/or downlink beam 180.

$$C_i = BW_i - D_i \qquad (2)$$

A flow control instruction may include an identifier of a destination of data (e.g., a geographical location of possible receiving terminal(s) 150), an identifier of a source of the carrier data (e.g., a cloud server), an associated bandwidth, and an available capacity. For example, the satellite gateway 105 computer 110 may be programmed to send a flow control message to a traffic gateway 160 from which the first carrier data is received including: an IP address of the first carrier data source, an identifier of the destination of the first carrier, a first bandwidth $BW_1$ of 400 Mb/s, and an available capacity of 100 Mb/s. Thus, as described above, a determination of first and second capacity, and thereby the determination of flow control instructions associated with the first and second carriers are performed independently. In other words, the first capacity is determined with respect to the first bandwidth and the first data throughput, and the second capacity is determined with respect to the second bandwidth and the second data throughput.

The satellite gateway 105 may be programmed to maintain a plurality of transmit queues, e.g., First-In-First-Out (FIFO) queues, in a computer 110 memory for each of the first and second carriers. The gateway 105 computer 110 may store temporally the data received from a traffic gateway 160 until transmitting the data to the modulator 120. The gateway 105 computer 110 may store the received first carrier data in a first memory (or a first section of the computer 110 memory) and the received second carrier data in a second memory (or a second section of the computer 110 memory) until the data is outputted to the modulator 120.

In one example, the gateway 105 computer 110 may be programmed to maintain a Code Rate Organizer (CRO) along with queuing and prioritization disciplines for each carrier, which keeps independent traffic management and congestion contexts across the hopped beams. CROs may be implemented based on DVB-S2 (Digital Video Broadcasting-Satellite-Second Generation) standard for GSE (Generic Stream Encapsulation) to encapsulate the carrier data and control data such as flow control, time schedule, etc. Additionally or alternatively, maintaining independent queues and CROs for each carrier may be performed outside the gateway 105, e.g., in an out-route subsystem geographically located in a different location compared to the gateway 105.

As discussed above, the traffic gateway(s) 160 transmits data to the gateway 105 and the gateway 105 computer 110 may be programmed to send flow control, e.g., including a capacity $C_i$ of a carrier, to the corresponding traffic gateway 160. In one example, the traffic gateway 160 computer 110 may be programmed to adjust the data throughput of data transmitted to the gateway 105 based on the received flow control instruction. For example, a first traffic gateway 160 transmitting data for the first carrier to the gateway 105 may receive a flow control instruction from the gateway 105 including a first bandwidth $BW_1$ of 400 Mb/s and a first capacity $C_1$ of 100 Mb/s. The traffic gateway 160 computer 110 may be programmed to increase the data throughput to the gateway 105 based on the received instruction indicating that 100 Mb/s of the first bandwidth $BW_1$ is not utilized. Additionally or alternatively, the traffic gateway 160 computer 110 may be programmed to increase, decrease, or maintain the data throughput to the gateway 105 based on the received instruction.

In another example, the system 100 may include a plurality of gateways 105. The traffic gateways 160 may be connected to the gateways 105, e.g., via an IP-based backhaul network, etc. Each gateway 105 is connected via a modulator 120 to a satellite 140. For example, the system 100 may be geographically non-centralized with satellite gateways 105 and traffic gateways 160 located in different geographical locations.

In one example, the traffic gateways 160 may transmit data to the gateway 105 based on geographical coverage area 185 of the satellite(s) 140 that communicate with each gateway 105 and the destination of data. For example, a first traffic gateway 160 computer 110 may transmit data to a first gateway 105 based on a destination of first data being within the coverage area 185 of a first satellite 140 communicating with the first gateway 105 having a coverage area 185 including the destination. A second traffic gateway 106 computer 110 may transmit data to the second gateway 105 based on a destination of second data being within the coverage area 185 of a first satellite 140 communicating with the first gateway 105 having a coverage area 185 including the destination. In one example, the system 100 may include a plurality of satellite gateways 105 and a plurality of traffic gateways 160. The traffic gateways 160 may be at a same location as the satellite gateways 105, or at different locations.

As discussed above, the data transmitted by the gateway 105 to the satellite 140 via the modulator 120 may have a propagation delay $t_g$. The timing synchronization system 190 can be configured to synchronize the satellite gateway 105 computer 110, the modulator 120, and the beam hopping capable satellite 140. In one example, the timing synchronization system 190 includes a computer 110 programmed to determine the propagation delay $t_g$ from the modulator 120 to the satellite 140 and to determine a time clock for each of the satellite 140, gateway 105, modulator 120 using various techniques such as using GPS time (Global Positioning System). Additionally, the synchronization system 190 may implement other techniques such as Precision Timing Protocol (PTP) to synchronize the gateway 105, the modulator 120, and the satellite 140. Additionally or alternatively, the synchronization system 190 may be included in a gateway 105 computer 110, or any other component of the system 100.

For a high availability system 100, the system 100 may include backup modulators 120 and/or backup gateways 105. In one example, the gateway 105 may switch to the backup modulator 120 upon determining, e.g., that the modulator 120 stopped operating. For example, the gateway 105 computer 110 may be programmed to configure the backup modulator 120 with the time schedule and synchronization of time. Thus, a switching to the backup modulator 120 may be seamless, i.e., a time needed to start an operation of the backup modulator 120 upon determining that the modulator 120 has stopped operating, is less than a time threshold, e.g., 1 second. Upon detecting, e.g., a stop of operating of a gateway 105, the traffic gateway(s) 160 may transmit data to the backup gateway 105 and the backup gateway 105 may start to transmit data to the modulator 120 based on stored time schedule. Alternatively, the satellite gateway 105 may send data to both modulators 120 so as to be ready for a fast switchover, with the backup modulator 120 muted and discarding data normally, but activated by the satellite gateway 105 in the event of primary modulator 120 failure.

Figure 3A:
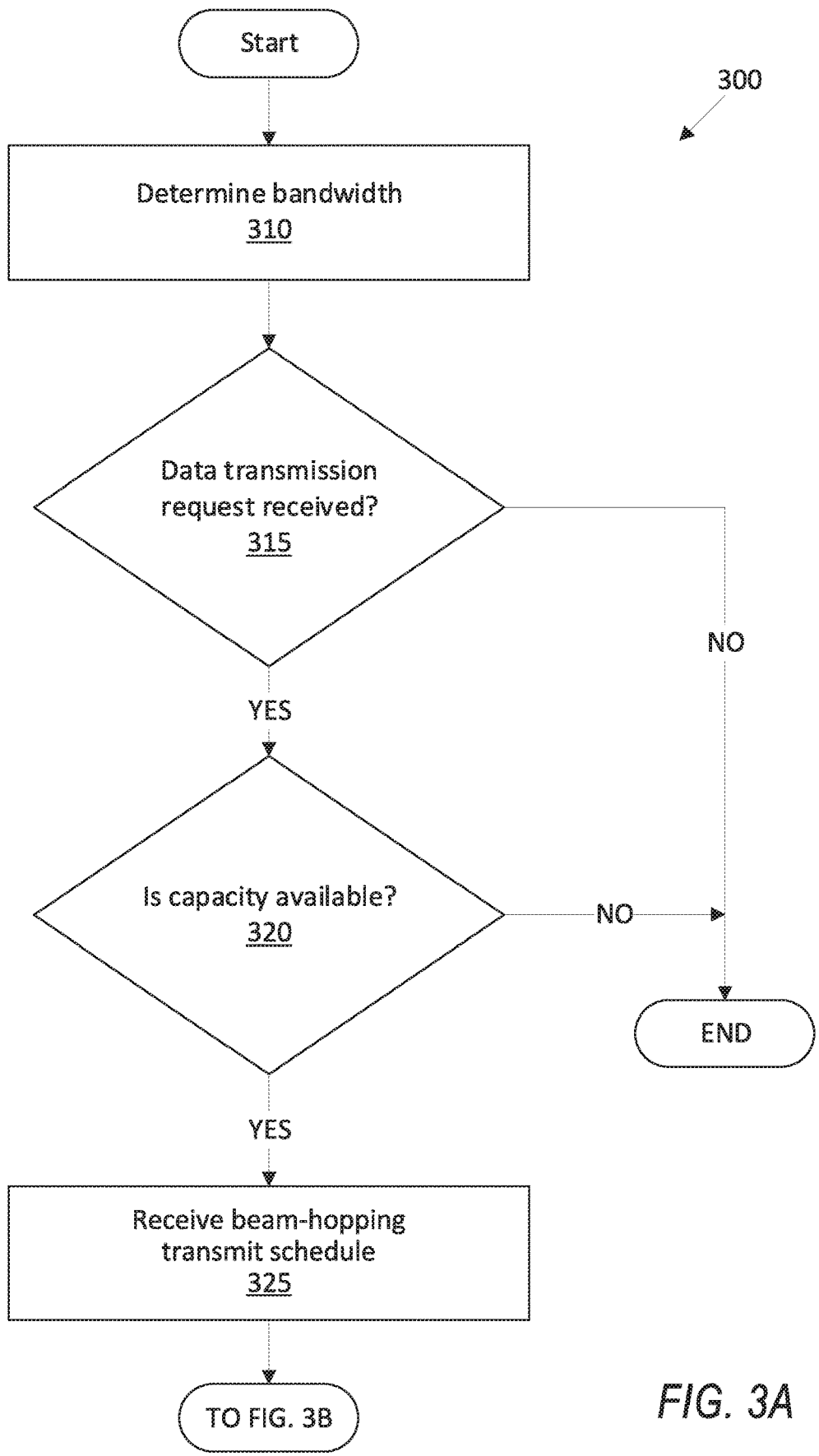
FIGS. 3A-3B are a process 300 for operating a satellite gateway.
Figure 3B:
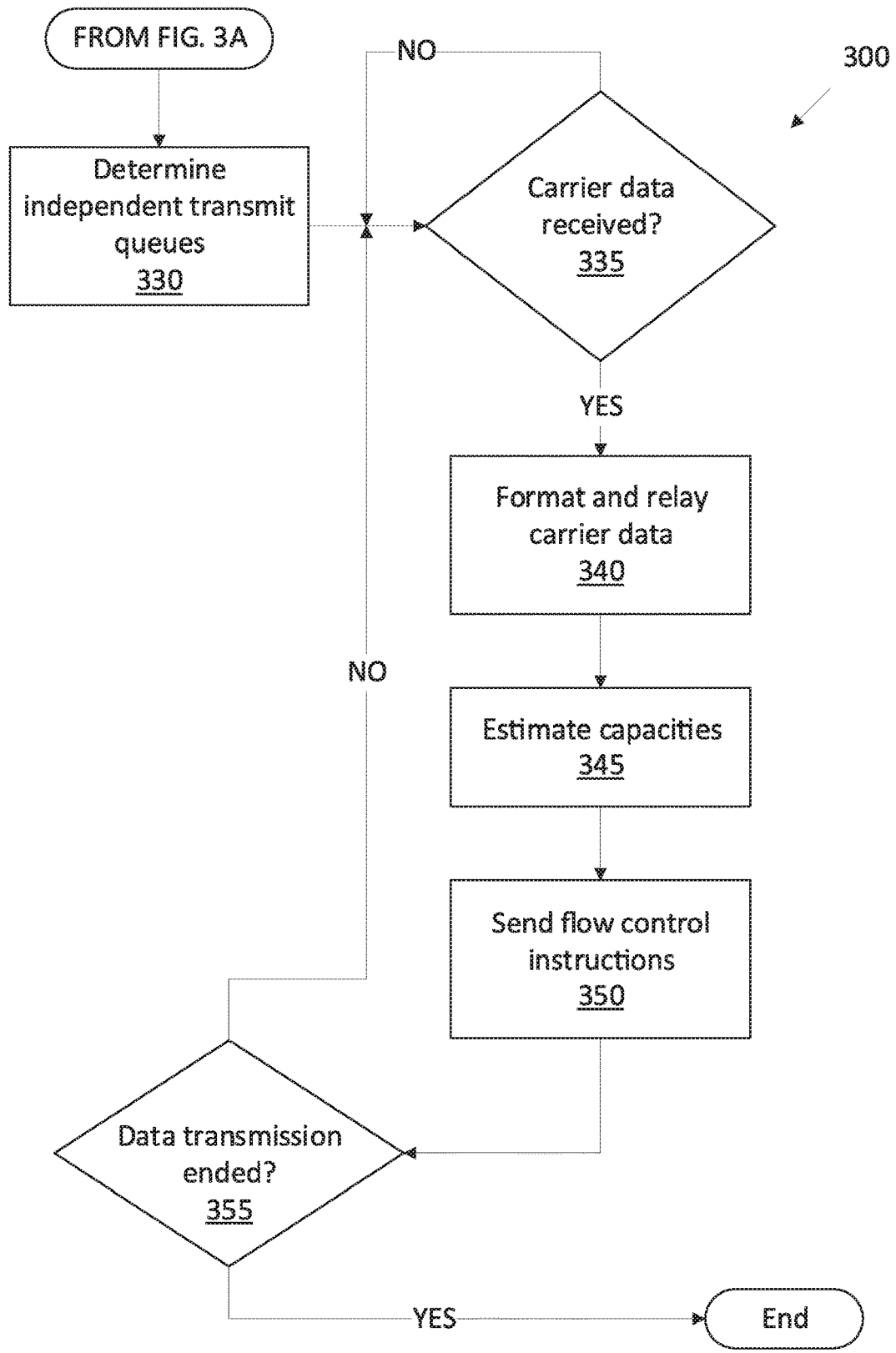

FIGS. 3A-3B are a process 300 for satellite gateway 105 operation. For example, the satellite gateway 105 computer 110 may be programmed to execute blocks of the process 300.

With reference to FIG. 3A, the process 300 begins in a block 310, in which the computer 110 determines a bandwidth for transmission of carrier data via a satellite 140 and the modulator 120. In one example, the computer 105 may determine a bandwidth of the satellite 140, a bandwidth of the modulator 120, and a bandwidth of the gateway 105, and determine a minimum of the determined bandwidths as the bandwidth for transmission of carrier data.

Next, in a decision block 315, the computer 110 determines whether a data transmission request was received, e.g., from a traffic gateway 160. For example, the traffic gateway 160 may send a request including a requested bandwidth for transmitting carrier data via the gateway 105. If the computer 110 determines that a transmission request was received, then the process 300 proceeds to a decision block 320; otherwise the process 300 ends, or alternatively returns to the block 310, although not shown in FIG. 3A.

In the decision block 320, the satellite gateway 105 determines whether a requested capacity $C_i$ is available. The satellite gateway 105 determines that the capacity $C_i$ is available upon determining that an unused bandwidth, e.g., 200 Mb/s, of the gateway 105 is greater than the requested capacity $C_i$, e.g., 100 Mb/s. If the gateway 105 determines that the requested capacity $C_i$ is available, then the process 300 proceeds to a block 325; otherwise the process 300 ends, or alternatively, returns to the block 310, although not shown in FIG. 3A.

In the block 325, the computer 110 receives a beam-hopping transmit time schedule, e.g., from the synchronization system 190. In one example, the computer 110 may be programmed to transmit a beam hopping time plan change request to the synchronization system 190 and receive an adjusted beam-hopping schedule from the synchronization system 190, as discussed above with respect to Equation (1). In one example, the computer 110 may determine a dwell time slot $\tau_i$ and adjust the time schedule accordingly. For example, if the dwell time slots $\tau_1$, $\tau_2$ already exist, then add a guard time $t_g$ after dwell time slot $\tau_2$ and then add a dwell time slot $\tau_3$ after the added guard time $t_g$. In other words, a time schedule including $t_g$, $\tau_1$, $t_g$, $\tau_2$ is changed to an updated time schedule $t_g$, $\tau_1$, $t_g$, $\tau_2$, $t_g$, $\tau_3$. The computer 110 may be programmed to then transmit the determined and/or updated time schedule to the modulator 120 and to the satellite 140.

Now, turning to FIG. 3B, in a block 330, the computer 110 determines independent transmit queues for each of the carriers, i.e., associated with each of the dwell time slots. In one example, the computer 110 may be programmed to determine independent queues, prioritization disciplines, CROs, etc., for each of the carriers.

Next, in a decision block 335, the computer 110 determines whether carrier data was received from the traffic gateway(s) 160. If the carrier data is received from the traffic gateway(s) 160, then the process 300 proceeds to the block 340; otherwise the process 300 returns to the decision block 335.

In the block 340, the computer 110 formats and relays carrier data to the modulator 120. The computer 110 may be programmed to format the data by placing the carrier data of each of the carriers in the corresponding dwell time slot $\tau_1$, $\tau_2$, . . . $\tau_n$. The computer 110 then relays the data by outputting the data formatted based on the time schedule to the modulator 120.

Next, in a block 345, the computer 110 estimates the capacities $C_1$, $C_2$, . . . $C_n$ for each of the carriers. For example, the computer 110 may be programmed to implement Equation (2) to determine the capacities $C_1, C_2, \ldots C_n$.

Next, in a block 350, the computer 110 sends flow control instructions to the traffic gateways 160. For example, the computer 110 may be programmed to send an available capacity $C_i$ for each of the carriers to the traffic gateway 160 which sends the respective carrier data. Additionally or alternatively, the flow control instruction may include an instruction to increase, decrease, or maintain the respective data throughput $D_i$.

Next, in the decision block 355, the computer 110 determines whether data transmission ended, e.g., based on receiving a message from the traffic gateway 160 indicating an end of transmission. If the computer 110 determines that the transmission of each of the carriers ended, then the process 300 ends (or alternatively returns to the block 310 of FIG. 3A, although not shown in FIGS. 3A-3B); otherwise the process 300 returns to the decision block 335.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system, comprising:
 a modulator, controlled by a satellite gateway computer, configured to transmit a first and a second carrier on a feeder uplink frequency to a beam-hopping-capable satellite according to a repeating, non-overlapping beam-hopping time schedule including a first and a second dwell time slot and a guard time between the first and second dwell time slots, the first carrier transmitted during the first dwell time slot, and the second carrier transmitted during theft second dwell time slot; the beam-hopping-capable satellite relaying the received uplink first carrier corresponding to the first dwell time slot to at least a first downlink user beam and the received uplink second carrier corresponding to the second dwell time slot to at least a second downlink user beam, wherein hopping from the first downlink user beam to the second downlink user beam is performed in the guard time;
 a timing synchronization system configured to:
 synchronize a satellite gateway computer, the modulator, and the beam hopping capable satellite, based on the beam-hopping time schedule and a propagation delay,
 a traffic gateway configured to receive data packets from a terrestrial network, and based on the user beam associated with each packet destination, relay packets to the satellite gateway computer based on a flow control instruction received from the satellite gateway; and
 the satellite gateway computer, programmed to:
 transmit the propagation delay to the satellite for determining beam hopping time based on the time schedule and the received propagation delay;
 determine transmit time schedule for the modulator based on the beam-hopping time schedule and input received from the timing synchronization system;
 format and relay packets destined to the first downlink beam to the modulator to be transmitted on the first carrier during the first dwell time slot,
 format and relay packets destined to the second downlink beam to the modulator to be transmitted on the second carrier during the second dwell time slot; and determine the flow control instruction, based on a first and a second capacity of the first and second carriers, and send the determined flow control instruction to the traffic gateway.

2. The system of claim 1, wherein the time synchronization system is further programmed to:
upon receiving a beam-hopping time schedule change request from the satellite gateway, coordinate among at least the satellite gateway, the satellite, and the modulator to adjust the beam-hopping time schedule; and
transmit the adjusted beam-hopping time schedule, via a payload configuration channel, to the beam-hopping-capable satellite.

3. The system of claim 1, wherein the timing synchronization system is further programmed to determine the propagation delay and transmit the propagation delay to the satellite.

4. The system of claim 1, wherein the satellite gateway is further programmed to maintain a first transmit queue for the first carrier independent from a second transmit queue for the second carrier.

5. The system of claim 1, wherein the satellite gateway is further programmed to:
estimate a first capacity for the first carrier based on a first bandwidth and a first data throughput;
estimate a second capacity for the second carrier based on a second bandwidth and a second data throughput;
send a first flow control instruction to a first source of the first carrier; and
send a second flow control instruction to a second source of the second carrier.

6. The system of claim 1, wherein a computer in the beam-hopping-capable satellite comprises a processor and a memory, the memory storing instructions executable by the processor to actuate a satellite transponder to switch from the first downlink beam to the second downlink beam based on the time schedule and the propagation delay.

7. The system of claim 1, wherein the traffic gateway is configured to relay packets, based on each packet destination, via a backhaul network, to one of (i) the satellite gateway and (ii) a second satellite gateway connected to a second modulator.

8. The system of claim 1, wherein the satellite gateway is further programmed to send packets to the modulator based on a flow control instruction received from the modulator.

9. The system of claim 1, wherein the satellite gateway is further programmed to send a flow control instruction including an identifier of a destination of data, a source identifier of carrier data, an associated bandwidth, and an available capacity.

10. The system of claim 1, wherein hopping from the first downlink user beam to the second downlink user beam is performed in a middle of the guard time.

* * * * *